US005345576A

United States Patent [19]
Lee et al.

[11] Patent Number: 5,345,576
[45] Date of Patent: Sep. 6, 1994

[54] MICROPROCESSOR SIMULTANEOUSLY ISSUES AN ACCESS TO AN EXTERNAL CACHE OVER AN EXTERNAL CACHE BUS AND TO AN INTERNAL CACHE, CANCELS THE EXTERNAL CACHE ACCESS ON AN INTERNAL CACHE HIT, AND REISSUES THE ACCESS OVER A MAIN MEMORY BUS ON AN EXTERNAL CACHE MISS

[75] Inventors: Phillip G. Lee, Aloha; Eileen Riggs, Hillsboro; Gurbir Singh, Portland; Randy Steck, Aloha, all of Oreg.

[73] Assignee: Intel Corporation, Santa Clara, Calif.

[21] Appl. No.: 816,603

[22] Filed: Dec. 31, 1991

[51] Int. Cl.$^5$ .............................................. G06F 13/00
[52] U.S. Cl. .................................................. 395/425
[58] Field of Search ............................... 395/400, 425

[56] References Cited
U.S. PATENT DOCUMENTS

| 4,190,885 | 2/1980 | Joyce et al. | 395/425 X |
| 4,464,717 | 8/1984 | Keeley et al. | 395/425 |
| 4,667,288 | 5/1987 | Keeley et al. | 395/200 |

*Primary Examiner*—David L. Robertson
*Attorney, Agent, or Firm*—Owen L. Lamb

[57] ABSTRACT

A data processing system which includes a microprocessor fabricated on an integrated circuit chip, a main memory external to the integrated circuit chip, and a backside cache external to the integrated circuit chip. The backside cache includes a directory RAM for storing cache address tag and encoded cache state bits. A first bus connects the microprocessor to the cache, the first bus including backside bus cache directory tags signals comprised of address bits used for a cache hit comparison in the directory RAM and backside bus cache directory state bits for determining a state encoding of a set in the directory RAM. A second bus connects the microprocessor to the main memory. The directory includes means for comparing the cache directory tags on the first bus with the tags stored in the directory and for asserting a Bmiss signal upon the condition that the directory tag stored in the backside bus cache directory do not match the backside bus cache directory tags signals. The microprocessor responds to the Bmiss signal by issuing the access onto the second bus in the event of a cache miss.

3 Claims, 3 Drawing Sheets

MICROPROCESSOR SIMULTANEOUSLY ISSUES AN ACCESS TO AN EXTERNAL CACHE OVER AN EXTERNAL CACHE BUS AND TO AN INTERNAL CACHE, CANCELS THE EXTERNAL CACHE ACCESS ON AN INTERNAL CACHE HIT, AND REISSUES THE ACCESS OVER A MAIN MEMORY BUS ON AN EXTERNAL CACHE MISS

CROSS REFERENCES TO RELATED APPLICATIONS

This application is related to the following copending patent applications: "A Pipelined Microprocessor in Which Multiple Functions are Performed During Each Pipeline Stage," Ser. No. 07/630,499, filed Dec. 20, 1990; "Instruction Fetch Unit in a Microprocessor That Executes Multiple Instructions in One Cycle and Switches Program Streams Every Cycle" Ser. No. 06/630,498, filed Dec. 20, 1990; "Instruction Fetch Unit With Early Instruction Fetch Mechanism," Ser. No. 07/784,569 filed Oct. 29, 1991;" Translating Instruction Pointer Virtual Addresses to Physical addresses for Accessing an Instruction Cache," Ser. No. 07/784,568 filed Oct. 29, 1991; and U.S. Pat. No. 5,210,845, entitled "Controller for two-way Set Associative Cache", granted May 11, 1993; all assigned to Intel Corporation, the assignee of the present invention.

TECHNICAL FIELD

The present invention relates to data processing systems and more particularly, to a bus between a microprocessor and a data cache which provides local storage for frequently accessed memory locations.

BACKGROUND ART

A cache is a relatively high-speed, small, local memory which is used to provide a local storage for frequently accessed memory locations of a larger, relatively slow, main memory. By storing the information or a copy of the information locally, the cache is able to respond to memory references and handle them directly without transferring the request to the main memory. The result is lower traffic on the memory bus.

The most powerful microprocessors used in IBM compatible personal computers use a cache to satisfy the increasing demands of application programs for more memory and faster operating speeds. The microprocessors have a central processing unit (CPU) and an internal cache integrated on a single chip. The purpose of the internal cache is to reduce the number of times the CPU has to interface with external memory subsystems for its instructions and data. This is accomplished as follows. When the CPU requests data, the address of the data is examined by the internal cache to see if the data is in the cache. If the data (or instruction) is in the internal cache, the CPU request can be satisfied within about 15 ns as compared to 70 to 100 ns when the data or instruction is not in the internal cache.

In order to further reduce the access time when the data/instruction is not in the internal cache, a second-level cache is often placed on the bus connecting the CPU to the main memory, resulting in much faster access times than the main memory. Such a cache is described in copending Ser. No. 07/618,708 which provides a cache controller which sits in parallel with the main memory bus so as not to impede system response in the event of a cache miss. The cache controller includes tag and valid-bit storage for associatively searching the directory for cache data-array addresses. This configuration has the advantage that both the second-level cache and the main memory can simultaneously begin to look up the access address. In the event of a cache hit, the data/instruction is supplied by the cache with zero wait-state. In the event of a cache-miss, the parallel look-up technique incurs no additional penalty. This configuration also has the advantage that it is easy to use, it is software transparent, can be installed by the end user, and provides write-through memory update using the same timing as the CPU. However, since it uses the main memory bus, the bus itself is not optimized for cache accesses, resulting in a performance penalty.

It is therefore an object of the present invention to provide a bus between a cache and a microprocessor that is optimized for cache memory bandwidth.

SUMMARY OF THE INVENTION

Briefly, the above objects are accomplished in accordance with the invention by providing a microprocessor fabricated on an integrated circuit chip; a main memory external to said integrated circuit chip; a backside cache external to said integrated circuit chip, said backside cache including a directory RAM for storing cache address tag bits; a first bus connecting said microprocessor to said cache, said first bus including backside bus cache directory tags signals comprised of address bits used for a cache hit comparison in said directory RAM and backside bus cache directory state bits for determining a state encoding of a set in said directory RAM; a second bus connecting said microprocessor to said main memory; said directory including means for comparing said cache directory tag signals on said first bus with said cache address tag bits stored in said directory and for asserting a Bmiss signal upon the condition that said directory tag stored in said backside bus cache directory do not match said backside bus cache directory tags signals; and, means in said microprocessor responsive to said Bmiss signal for issuing said address bits on said second bus.

The invention has the advantage that because the bus between the external cache and the microprocessor is separate from the main memory bus, it is optimized for cache memory bandwidth.

BRIEF DESCRIPTION OF THE DRAWINGS

The invention will be apparent from the following more particular description of the preferred embodiment of the invention as illustrated in the accompanying drawings, wherein.

DESCRIPTION OF THE PREFERRED EMBODIMENT

Figure 1:
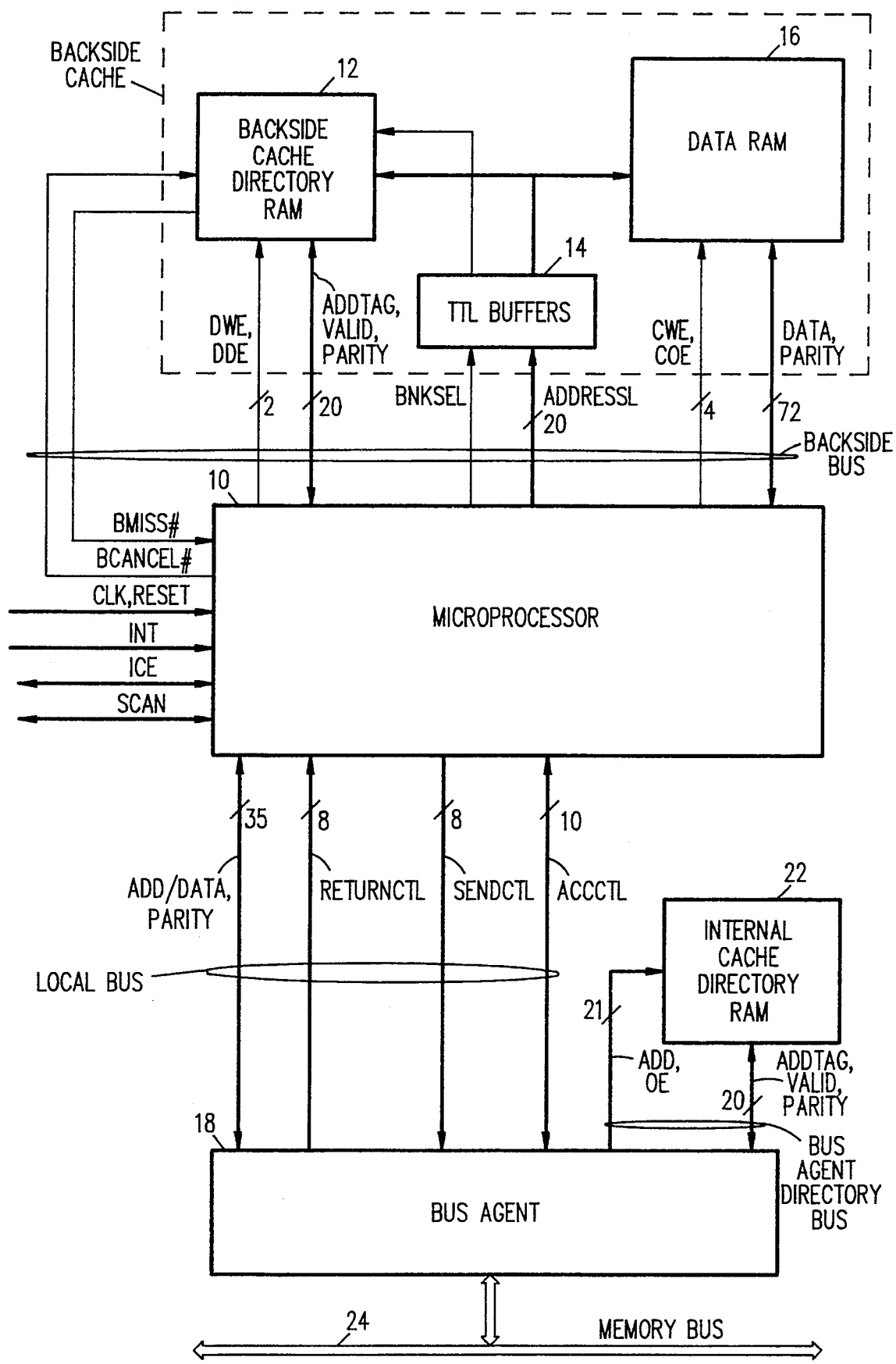
FIG. 1 is a block diagram of a data processing system in which the invention is embodied.

Refer now to FIG. 1 which is a block diagram of a data processing system in which the invention is embodied. The system is composed of the following elements: a microprocessor (10), a cache (16) and directory (12), a Backside Bus or BBus that connects the microprocessor to SRAMs (12, 16), a bus agent (18), a memory bus interface, a local bus which connects the microprocessor to the bus agent, the bus agent Directory Bus or DirBus which connects the bus agent to the directory (22).

There are two external interfaces to the processor: (1) the Backside Bus controlled by the Backside Bus Logic (BBL), and (2) the local bus controlled by the Local Bus Logic (LBL). All memory accesses from the processor first get looked up in the Backside Bus cache. If they miss the cache, they are passed onto the local bus. The two bus units are serially connected. This means that all local bus accesses from the processor were first-cache misses on the Backside Bus.

Every access generated by the processor that does not hit its internal cache is looked up in the external cache by the Backside Bus Logic (BBL). If the data is not in the external cache or private memory, the access is passed to the Local Bus Logic (LBL). The LBL sends the access on the local bus. This is the processor's port to main memory via the bus agent. The bus agent in turn places the access on the memory bus. The bus agent resolves any cache coherency conflicts and returns the data to the processor cache and Backside Bus cache over the local bus. It also updates both processor and bus agent copies of the cache directories in the process of a cache fill.

The microprocessor shown in FIG. 1 has a number of units that the are briefly described below. For more detailed information about each of these units refer to the above-identified Ser. No. 07/630,499.

Loads

Figure 2:
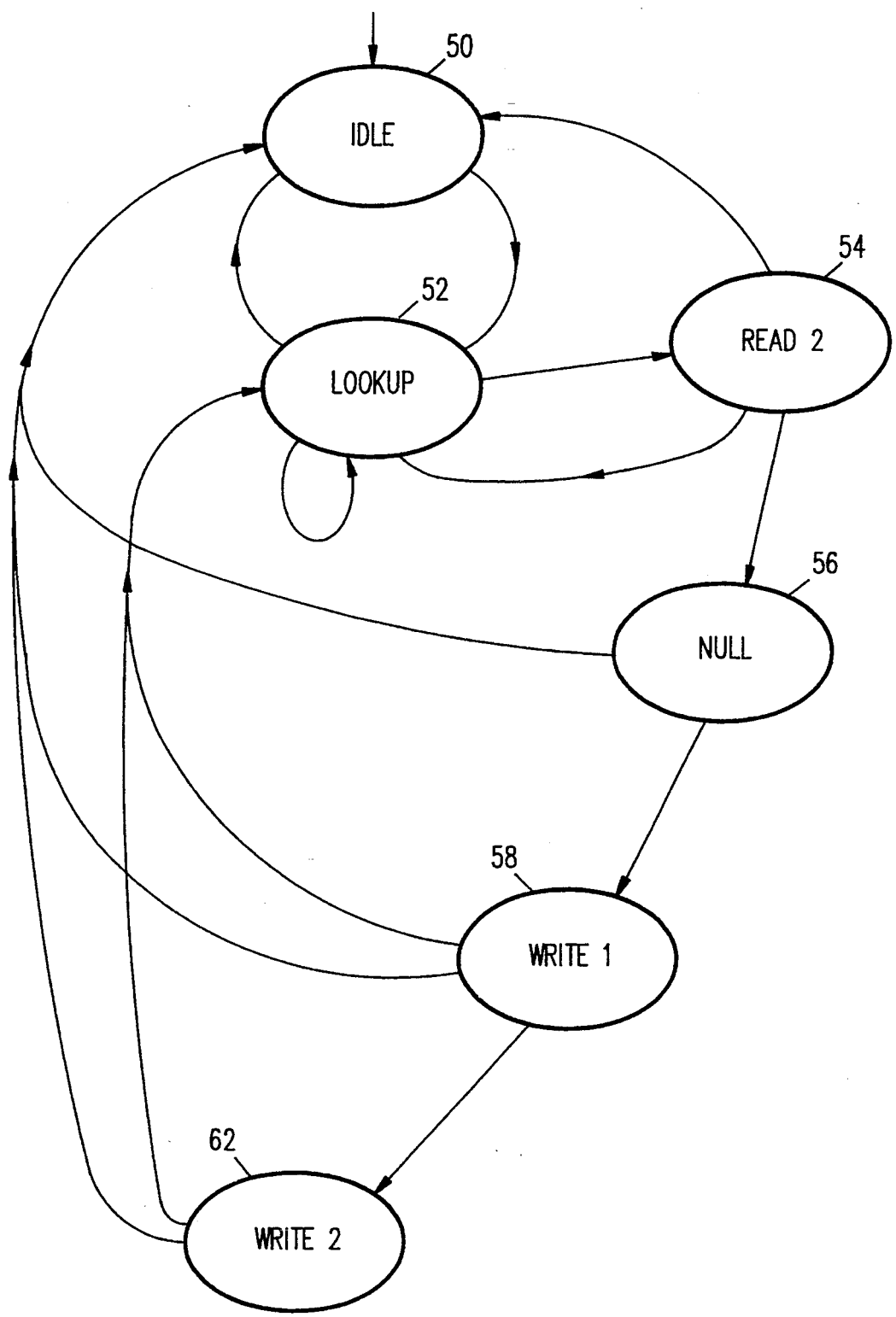
FIG. 2 is a state diagram of a read and write operation.
Figure 3:
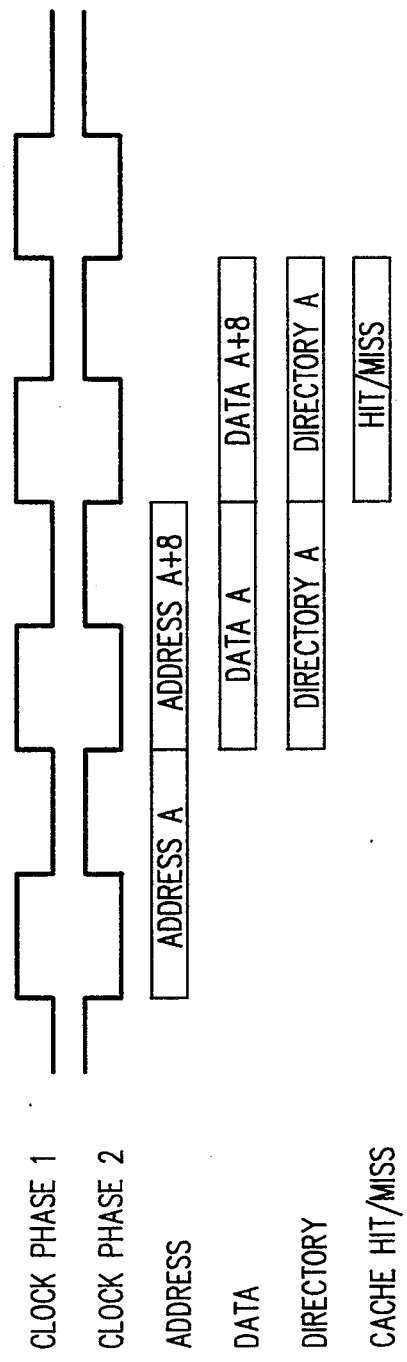
FIG. 3 is a timing diagram which shows a read operation.

Refer to FIG. 2 and the timing diagram of FIG. 3. The BBL transforms all loads into quad word loads starting at the base of the 16-byte block. The cache lookup (52) occurs at the same time as the data is being read (54) from the RAM. BMiss# asserted in the third cycle of an access signals that the access missed the external cache. To hit the cache the directory tag must match the address, coherency bits must be valid, and the cache must be enabled. Load data can be returned onto the LdData Bus in q51 and instruction fetches can be returned q41. The return timing depends on BBL queue status, Bus status, external cache hit, and in the case of load data, also data alignment and Ldbus arbitration. To achieve q51 timing for data return, the BCL queues must be empty, the BBus tree, the requested data in the external cache, and BBLGuessq41 must win the LdBus grant. Ifetch q41 timing depends on all of the above except LdBus arbitration. The BCL has a dedicated 64-bit return path to the instruction fetch unit (IFU) which it need not arbitrate for. The first64 bits of the Ifetch are returned in q41 before the cache directory lookup is complete, so the data is a guess. When the second half of the data is returned in q51, data valid will be signaled by FetValid. This second FetValid indicates that the entire 16 bytes are valid. Data loads are not returned until q51 when the external cache lookup is complete. Valid load data is signaled by LdValid.

Loads that miss the backside cache are sent out on the local bus after the miss has been determined. The local bus is a half-speed, 32-bit multiplexed address/data bus. The address/data lines are LAdDt. LNewBlk indicates the start of a new access. A local bus signal, LBPOwn (local bus processor own) signals that the processor is driving the local bus. The memory bus agent (18) on the local bus will return the load data requested, and if cacheable, it will return the full 16-byte block, so the external and internal caches can be filled. At the same time as the backside cache is being filled, the BBL load logic picks up the data off of the backside bus just as it would if the data had come out of the cache. The BBL load logic aligns the data and returns it to the microprocessor. Returning data from the LBus in this way simplifies the BBL return path. Loads that are noncacheable and are not being loaded into the cache are still sequenced on the backside bus, so that the BBL load logic can pick up the data. The Write Enables are not asserted for the RAM (16), so the data doesn't actually get written.

The load path to the backside cache is highly optimized. There is a significant performance difference between cache hits and misses. Cache hits are returned in q51, misses are returned in q19 (18 cycles after issue) best case.

Stores

Figure 4:
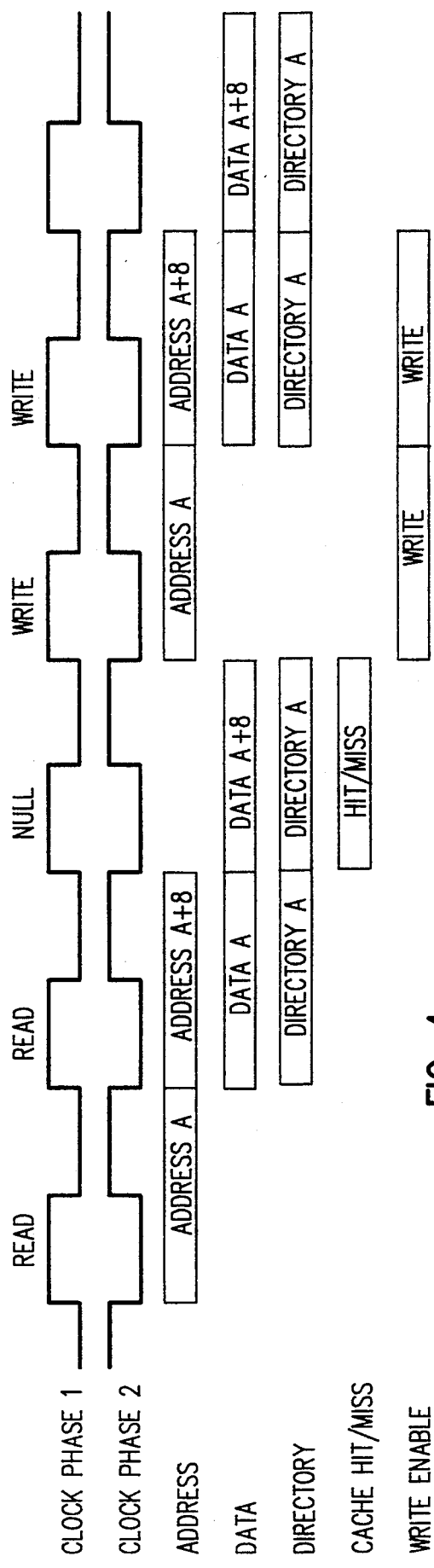
FIG. 4 is a timing diagram which shows a write operation.

Store sequencing, shown in FIG. 4, is much slower than load sequencing due to the external directory lookup being necessary before the Write can occur. The first two cycles of a store look just like a load (FIG. 2), the full quad is read (54) from the cache while the cache lookup (52) occurs. The new store data is merged into the old data read from the cache to allow a full double or quad Write with interlaced parity to be written (58) back into the cache. On Cycle 4 of the backside bus access, the actual Write (58) of the first64 bits occurs if the access hit the external cache. Cycle 5 writes the second 64 bits. There is a Write optimization that will allow store data totally contained in the half of the quad to be written in one cycle (4-cycle Write).

Write "hits" that were to be "shared," or "exclusive-clean" data, will be sent to the local bus. This allows the local bus agent to update its cache directory to the "dirty" state. These Write hits will not be sent onto the system bus by the bus agent.

Writes that miss the backside cache are aborted after the two-cycle read is completed. Write misses cause the backside bus to "stall" (called "Write stall"). Write stalls are necessary to allow the bus agent to do an address compare of the Write miss to all outstanding accesses for self-coherency reasons. After the compare is complete, LWrCir is signaled and the backside bus unstalls. In simple applications LWrCir can be tied high. In this case, the backside bus will "stall" for two cycles after the Write lookup completes before the next backside access can be issued. A Write miss access occupies a BCL "queue" entry until the access has been sent on the LBus.

Backside Cache

The backside cache is divided into instruction, data, private memory, and I/O space. The BBL asserts B1Cache, BPMem, or BIO in the first cycle of the access to indicate which section of RAM the address of the access maps into. Data cache accesses are signaled by default if none of the signals that select other regions are asserted. Instruction regions can be mapped into the data cache by setting the instruction regions in the IFU. The BBL will return these instructions to the IFU, but external to the processor they cannot be differentiated from data. The BBL supports a unified backside cache as well as a variety of segregated instruction/data cache sizes. There exists hardware in the BBL to assist in initializing the cache directory. The cache can also be disabled.

The Cache

The cache is comprised of a data RAM (16) which is an array of synchronous SRAM that operates at 32 MHz. It is capable of providing 64 bits of data to the processor every clock cycle without any wait states. The SRAM (16) is logically divided into a data cache, an instruction cache, and private memory that can hold both instructions and data. The data cache occupies one bank of SRAMs while the other bank is equally divided between the instruction cache and private memory. The directories for the two caches are maintained in a separate bank of SRAMs the backside cache directory RAM (12) and are accessed simultaneously with the data.

Private memory is a region of physical memory that is mapped to local SRAM. It is commonly used as a cache of the most frequently called operating system procedures. Private memory may also hold external microcode for the processor, and interrupt handlers for lower-interrupt latency. Private memory is sequenced just like a cache that never misses.

The Backside Bus

The Backside Bus is a high-speed bus optimized for cache memory bandwidth. The processor has 256 MB/sec of memory bandwidth because a large cache gives a very good hit rate over the 64-bit wide, 32 MHz bus. Because the processor is very hungry for memory bandwidth, it is expected that the processor will consume upwards of 70-80% of the available Backside Bus bandwidth.

This bus operates at the same clock speed (32 MHz) as the processor. It has a separate address path, data path, and directory tag path. Control signals effectuate the separation of data RAM (16) into data cache, instruction cache, and private memory. The address is pipelined so the bus reads 64 bits of data every cycle.

The bus agent

The bus agent (18) connects the processor module (10) to the memory bus (24). The bus agent handles a cache miss for the processor. The bus agent also controls the operation of the bus agent directory bus.

The bus agent constantly monitors the memory bus traffic for coherency hits to the cache. This bus snooping does not interrupt the accesses because the bus agent has a private-cache directory (22) to do the lookup. In response to a request that hits the cache, the bus agent can flush the processor cache data and update both the cache directories (16 and 22).

The Local Bus

The local bus connects the microprocessor (10) to the bus agent (18). It is a multiplexed address/data bus that operates at 16 MHz. This bus does not handle nearly as much traffic as the Backside Bus. It is the secondary port out of the processor to main memory and processor-controlled I/O.

The local bus is designed to minimize the pin count while supporting multiple outstanding requests to main memory. It is a multiplexed bus with extra signals to support the bus agent's control of the processor's cache directory. The traffic on this bus are accesses that support the processor's external cache (misses, fills, invalidates, and flushes) plus noncacheable accesses and memory bus coherency traffic. The local bus operates at the clock rate of the bus agent which is half of the processor rate (16 MHz).

The bus agent directory Bus

The bus agent Directory Bus connects the bus agent to the cache directory (22). This is a duplicate copy of the directory (16) that is kept by the bus agent for bus snooping and coherency management.

Address and Control Signals Definitions

BNewBlk# Backside Bus New Block indication. This is asserted during the first cycle of an access. This is used to synchronize with the external logic. BNewBlk# is asserted low.

BCancel# Backside Bus Cancel access indication. The access hit an internal cache or missed the translation lookaside buffer (TLB). This access will only be one cycle long. This comes out one cycle after the first address. BCancel has its own buffer power and ground pins to limit noise from the other signals. This should be lightly loaded to reduce noise. BCancel# is asserted low.

BMiss# Backside Bus Cache Miss indication. This indicates if the access hit the cache. This is an output of the processor to external sequencer logic. It is used to override the Write sequence signaled by BWr. This is driven one cycle after directory data is latched by the processor. It is only asserted if the access is to the cache and either the address comparison mismatches or the cache state is "invalid." (see TABLE II) BMiss# is asserted low.

BWrlCyc# Backside Bus Write of One Cycle of data. If BWrlCyc#is asserted and a Write hits the cache, it will use the optimized 4-cycle sequence (double word or less). This signal is driven with the second address. This combined with BWr can be used to determine the type of Write access. BWrlCyc# is asserted low.

Timing Diagrams

The timing diagrams of FIG. 3 and FIG. 4 show simple Reads and Writes. There is one access shown in each figure.

The basic flow of the Backside Bus is defined by what is needed to pipeline accesses to the RAMs. Synchronous SRAMs that have address latches are used so that the entire bus timing can be pipelined to provide a double word of data every cycle.

1. All processor Backside Bus output signals are driven starting ⅛ cycle (4 ns 32 MHz) after the rising edge of the clock. All inputs are sampled using the rising edge of the clock. This ⅛ cycle separation between the input sample and output drive is needed to get an acceptable hold time.

2. The Backside Bus is fixed timing, zero wait state (0WS). This is because the performance penalty of adding a wait state is too significant to justify the added complexity.

3. All accesses, both Reads and Writes, always start by doing two Read cycles.

4. Any access can be canceled during the first cycle. The access is canceled if there was a TLB fault or a Read that hits the internal data cache.

5. All sizes of Reads always get four words of data taking two cycles.

The address and control lines (BAddr, BPMem, FlFet, BWE, BIO, BWr, BNewBlk, BCancel, BWrlCyc) are tristated only during RESET. These lines must always be driven to a valid TTL level. Most of these lines can have any value during idle cycles. This is expected to be a mirror of the internal processor bus. The BWE and BNewBlk lines have to deassert during idle cycles.

Backside Bus Read Sequence

FIG. 3 shows an overview of the Backside Bus Read Pipelining. During the first cycle of a Read, the processor drives the first address. During the second cycle, the processor gets the first double word of data and also the cache-directory data. The second cycle is also used to drive the address for the second double word of data. During the third cycle the processor uses the directory information to determine if the access hit the cache. Also during the third cycle the processor can start driving the first address of the next access.

All Reads are two cycles, quad words. Reads take two cycles in the pipeline. The first double word of data is sampled two cycles after the address is driven. A cycle is used to propagate the address to the RAMs and a cycle is used to access and return RAM data. It takes three cycles for the processor to obtain all four words of data.

If the access was an instruction fetch, instruction data is streamed back into the processor before the Hit/Miss is determined. Instruction decoding begins and the decode is aborted if the access misses the cache. This makes instruction fetches effectively zero wait state. For data fetches, all four words are returned to the processor and the internal data cache at one time. This means data fetches have effectively one wait state for a quad word.

Read Hits and Misses are sequenced the same way because the Hit or Miss is not known until the request is complete. So this one timing diagram shows both Read Hit and Read Miss. There is no difference if the Read is to cache or private memory, except that private memory always hits the cache.

The Backside Bus has a special performance feature called wraparound. This means for a 16-byte Read the first double word could be from either the low-order double word or the high-order double word. All the Backside Bus Read timing diagrams show "ADDRESS A" followed by "ADDRESS A+8." This is modulo-16, meaning it could also be "ADDRESS A" and "ADDRESS A-8" if address A is to the upper double word. Wraparound Reads are only used for instruction fetches. They gain a couple percent performance because the branch target gets into the pipe one cycle earlier. (Wraparound also affects the start-up of Writes, because the "true address" is what is read from then the wraparound address.)

Backside Bus Write Sequences

Backside Bus Writes have two added pieces of complexity: (1) the non-byte parity forces Writes to use a Read-Merge-Write type sequence, and (2) there are two lengths, four-cycle and five-cycle. The wide external data word with non-byte parity forces the processor to read the existing data then merge in the new data. The different Write sequences vary in how many data words are written.

All Writes start with a standard two-cycle Read. The new data is then merged into the existing data and the Write begins if the Write hits the cache.

FIG. 4 shows an overview of the Backside Bus Write pipelining. There is no difference if the Write is to cache or private memory.

The first three cycles of a Write are just like a Read. During the fourth cycle, if the access hit the cache, the processor drives the first address again and asserts Write Enable. During the fifth cycle, the processor drives the first double word of merged data. Also during the fifth cycle the processor drives the second address and second cycle of Write Enable. The sixth cycle the processor drives the second merged double-word data, along with the first address of the next packet.

What is claimed is:

1. A data processing system comprising:
   a microprocessor fabricated on an integrated circuit chip;
   a main memory bus;
   a local bus connected to said microprocessor;
   a backside cache external to said integrated circuit chip, said backside cache including a directory RAM having cache address tag bits stored therein;
   a backside bus connected to said microprocessor and to said backside cache,
   said backside bus including backside bus cache address tag signals and backside bus cache directory state bits for determining a state encoding of a set in said directory RAM;
   a bus agent connected to said local bus and to said main memory bus;
   said backside bus further including a Bmis# signal;
   said directory RAM including means for comparing said cache address tag signals on said backside bus with said cache address tag bits stored in said directory RAM and for asserting said Bmis# signal upon a condition that said cache address tag bits stored in said directory RAM do not match said backside bus cache address tag signals; and,
   means in said microprocessor responsive to said Bmis# signal for issuing an address to said bus agent over said local bus.

2. The combination in accordance with claim 1 wherein said backside cache is divided into instruction, data, private memory and I/O space and said bus agent includes signals to indicate which one of said instruction, data, private memory and I/O space of said backside cache an access maps into.

3. The combination in accordance with claim 1 further comprising:
   an internal cache directory RAM;
   said backside bus further including a Bcancel# signal; and,
   means in said processor for asserting said Bcancel# signal upon a condition that said access hit said internal cache directory RAM.

* * * * *